United States Patent Office 2,944,141
Patented July 5, 1960

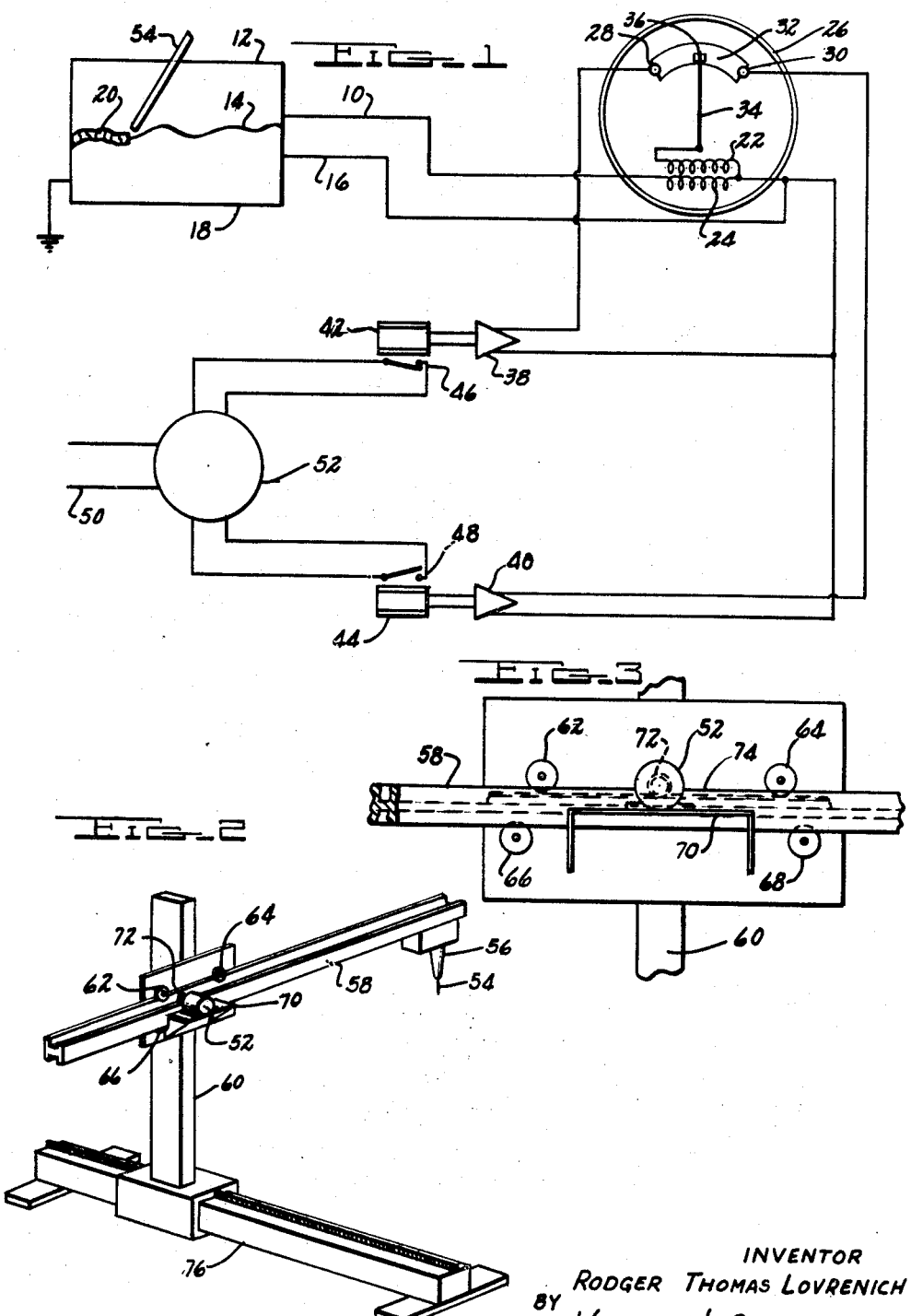
July 5, 1960
R. T. LOVRENICH
2,944,141
APPARATUS FOR ELECTRIC ARC WELDING
Filed Dec. 8, 1958
2 Sheets-Sheet 1
INVENTOR
RODGER THOMAS LOVRENICH
BY KOTTS & SHERIDAN
ATTORNEYS

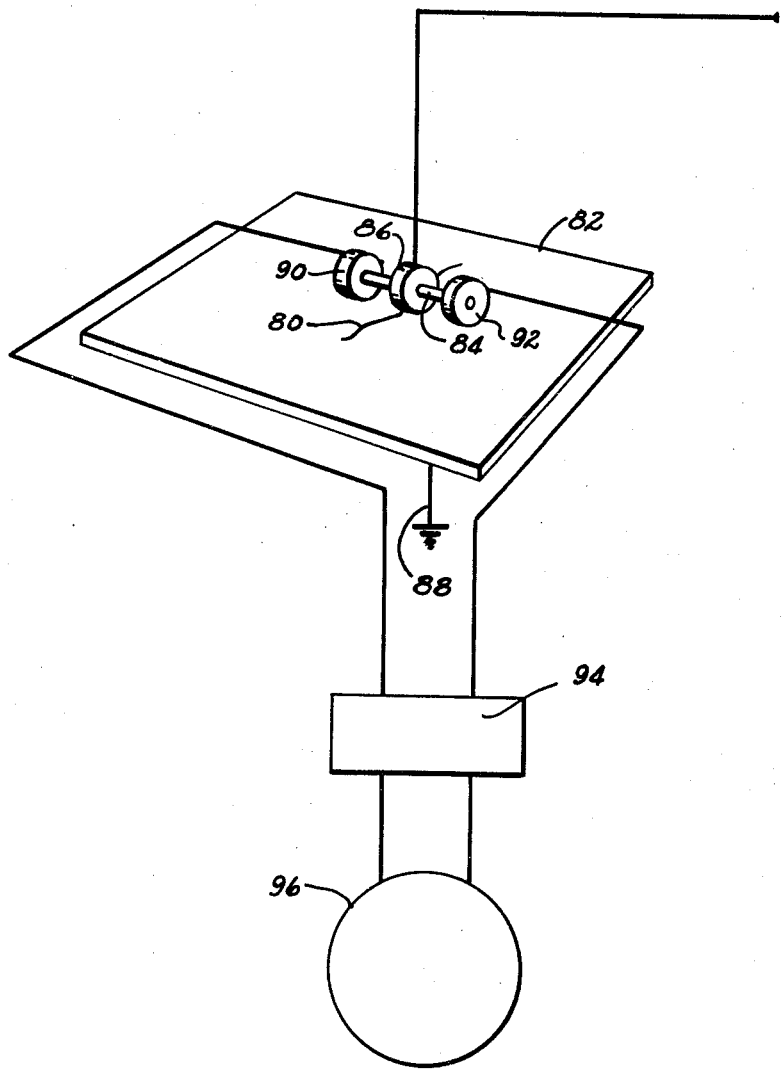

2,944,141

APPARATUS FOR ELECTRIC ARC WELDING

Rodger T. Lovrenich, 21456 Karl, Detroit 19, Mich.

Filed Dec. 8, 1958, Ser. No. 779,026

9 Claims. (Cl. 219—131)

This invention concerns a method and apparatus for locating or indexing a scratch or crack in a piece of metal as in electric arc welding and more particularly concerns an automatic method of and apparatus for controlling the direction of movement of an electrode to locate or index a crack or, in the case of welding, to automatically move the electrode along the crack between the two metal pieces to be welded regardless of how crooked such a crack may be. This application is a continuation-in-part of application Serial No. 620,109, filed November 2, 1956.

It is known to those skilled in the art that relatively little difficulty is experienced in building an automatic arc welding apparatus for the welding of two pieces of metal with relatively straight edges. This latter requires merely a setting of the device to provide for the automatic movement of the electrode in a straight line across the workpieces and a positioning of the pieces accordingly. However, a real problem has been encountered where the crack to be welded does not lie in a straight line and particularly where the crack does not even approximate a straight line. This problem has heretofore required careful attention by an operator to make sure that the electrode moves along the crack to be welded.

Similarly it is very difficult to locate scratches and cracks in metal pieces, particularly where the crack is internal and does not show on the surface. One such "crack" or defect might be the result of an inferior welding effort where the original crack was not completely filled in.

It is therefore an object of this invention to provide an apparatus and method for indexing; that is, pointing out, locating, or following; a crack in a metal piece.

It is also an object of this invention to provide an apparatus and method for automatic electric arc welding wherein the welding electrode automatically follows the crack between the two metal workpieces regardless of the extent of the deviation of the crack from a straight line.

It is a further object to provide such an apparatus which is simple in construction, economical to operate and which is adaptable for use in practically all metal working shops without undue investment in costly equipment.

I have now found that the foregoing and related objects can be secured in an apparatus comprising an indexing electrode adapted to be moved across the surface of an electrically grounded metal piece and adapted to introduce an electric current into said piece; a pair of auxiliary electrodes spaced from each other and from said indexing electrode; and electrical means to detect differences in electrical potential between said auxiliary electrodes.

Similarly, in the specific case of an arc welding apparatus, the movements of the welding electrode are made responsive to variations in electrical eddy currents in the metal workpieces. More particularly the apparatus for welding comprises a welding electrode adapted to be moved across the pieces longitudinally in the same general direction as the crack between the pieces, electrical means to detect differences in electrical potential between said pieces, a reversing motor, and electrical elements responsive to said differences in electrical potential to direct movement of said motor, said motor being engaged with said electrode to give lateral movement of said electrode relative to said crack.

The method of the invention comprises the step of effecting lateral movement of the welding electrode relative to the crack between the metal workpieces responsively to differences in electrical potential between said workpieces; or more broadly to move the indexing electrode in a predetermined pattern across the surface of the metal piece and thus cause it to pass over cracks in a manner to induce differences in potential between two auxiliary electrodes.

I have found that under normal arc welding conditions the passage of current through the welding electrode and the metal workpieces sets up electrical eddy currents in the workpieces. The eddy currents in any one of the two work-pieces varies somewhat depending on whether the welding electrode is on one or the other side of the crack between the two workpieces. This variation in the eddy currents is probably effected by the resistance of the crack itself. Similarly, one may introduce a current into the workpiece with an indexing electrode to create eddy currents. These eddy currents have now been found to influence the voltage indicated by auxiliary electrodes in a specific manner. Thus, if the metal is completely solid and of uniform cross section in the area of the indexing electrode and the two auxiliary electrodes, there will be no difference in potential between the two auxiliary electrodes. However when a crack appears between the indexing electrode and one of the auxiliary electrodes a potential difference is set up.

Whatever the theory may be, however, I have found in the case of welding that if electrical leads are attached to each of the two workpieces; that is, a lead on each side of the crack to be welded; a current flows in said leads from one plate to the other or, in other words, a voltage differential is set up. I have found that under average welding conditions this voltage difference amounts to about 0.1 millivolt to about 1.0 millivolt. Thus, the electrical signal resulting from the difference in eddy currents in the two workpieces can be amplified by common and readily available electrical instruments to provide a signal which can be passed to relays controlling a reversing motor. The reversing motor may, in turn, be coupled with the welding electrode in a manner such that the direction of current between the two workpieces determines the direction in which the reversible motor will operate and thus determines indirectly the directional adjustment of the electrode relative to the crack between the pieces.

The invention may be more fully understood by reference to the accompanying drawings wherein:

Fig. 1 is a schematic drawing showing how the various mechanical and electrical elements may be linked together to accomplish the objective of the invention.

Fig. 2 shows in perspective an automatic arc welding device embodying the principles of the present invention.

Fig. 3 shows an elevation view of a section of a portion of Fig. 2 in order to show more clearly the positioning of certain of the mechanical elements.

Fig. 4 is an alternate form of the present invention.

Referring more particularly to the drawings an electrical lead 10 is secured to one 12 of a pair of workpieces to be welded together along the crack 14 between the two pieces of metal as they lie side by side in welding position. A second electrical lead 16 is attached to the other 18 of the pair of workpieces to be welded. The diagram illustrates that a portion 20 of the workpieces 12, 18 has already been welded. The electrical leads 10, 16 pass through an indicating coil 22 and locking coil 24 of a millivolt meter 26 which is provided with limit posts 28, 30 at the opposite ends of the indicating dial 32 of said millivolt meter 26. A needle 34 in said volt meter 26 is provided with a conducting post 36 which is adapted to make electrical contact with one of said posts 28 if the needle 34 swings to the left (as shown) and is also adapted to make electrical contact with the other side post 30 in the event the needle 36 swings to the right (as shown). Amplifying systems 38, 40 are provided to amplify the electrical signal which is passed through the millivolt meter 26. The amplified signals are then passed to relays 42, 44 respectively; said relays operating switches 46, 48 respectively. The switches 46, 48 are in the power line 50 supplying a reversing motor 52.

Details of the electrical system are not given since they are not a part of the invention per se. There are available numerous standard and well-known pieces of equipment which accomplish the present purposes of amplification and relay action.

With reference to Figs. 2 and 3 as well as Fig. 1 an electrode 54 is shown in position for longitudinal movement along a crack 14 to be welded and for lateral movement relative to the crack 14. The electrode 54 and electrode holder 56 is secured to a laterally moveable post 58 and the latter is secured to the vertical post 60 by means of rollers 62, 64, 66, 68. The reversing motor 52 rests on platform 70 which is rigidly attached to the vertical post 60. A gear 72 is driven by the motor 52 and is geared to a gear rack 74 forming a part of the horizontal post 58.

The vertical post 60 is engaged for longitudinal movement relative to a stationary base 76. The details of this latter automatic longitudinal movement are not shown in detail since they are well known and are not a part of this invention per se. It will be apparent to those skilled in the art that many ways can be devised to provide for the longitudinal movement of the welding rod along the workpieces and that many ways can be found to support the various structures above the workpieces. For maximum benefits of this invention it is necessary merely that the supporting structure provide for the carrying of a reversing motor longitudinally along the crack in the workpieces in a manner such that the motor and electrode maintain their relative physical position.

In operation, the two workpieces 12, 18 are set side by side in a manner such that the crack 14 to be welded lies in the general direction as the automatic longitudinal movement of the welding electrode 54. When the electric arc is struck eddy currents are set up in the two workpieces. If the welding electrode 54 is centered on the crack the eddy currents in the workpieces will be substantially equal and there will be little or no resulting voltage signal to be transmitted to the millivolt meter 26. In his latter event there will be no signal sent to the reversing motor 52 and consequently no adjustment of the electrode 54 will take place.

However, if the direction of the crack 14 should deviate from the direction of longitudinal movement of the supporting structure for the electrode then there will be a difference in the eddy currents in the two workpieces. This latter will cause the needle 34 of the millivolt meter 26 to deflect either to the right or to the left depending upon the direction of the crack 14 relative to the electrode 54. If this deviation is relatively minor the contact post 36 on the needle 34 will not touch either of the side contact posts 28, 30 of the millivolt meter and again no signal will pass to the reversing motor 52 and no adjustment will take place. However, if the deviation discussed is sufficient the contact post 36 of the needle of the millivolt meter will actually touch one or the other of the side contact posts 28, 30. This then will establish an electrical circuit through the needle of the volt meter causing a current to go to the left relay 42 or the right relay 44 as the case may be.

Assuming that the instrument is so set up that a deviation of the weldable crack 14 to the left of the electrode 54 causes the needle 36 to deflect to the left (as shown in the diagram) then a voltage signal will be sent through the left amplifying circuit 38 to the left relay 42. The resulting actuation of the left relay permits the power 50 to pass through switch 46 to the reversing motor 52 to cause the reversing motor to rotate in that direction which causes the welding electrode to move to the left. When the electrode has moved sufficiently far to the left that it again is over the crack between the two workpieces the eddy currents will again approach an equal value and the signal in the millivolt meter will be something less than that required to maintain contact between the contact post 36 of the needle and the left side contact point 28. When this latter contact is broken there is no further movement of the reversing motor and the welding electrode assumes a fixed position relative to the crack. Thus as the welding rod proceeds longitudinally along the general direction of the crack between the two workpieces it will be constantly adjusted in the manner shown to make a satisfactory weld and without jumping over an area where the crack has deviated considerably from a straight line.

As indicated above there is no invention per se in the electrical system. It is merely necessary that the electrical signal coming from the two workpieces be detected and that it be amplified sufficiently to activate a suitable relay which in turn is adapted to activate a reversing motor. Such electrical devices are common articles of commerce and it would serve no purpose to detail their structure here.

Although for purposes of illustration I have shown a voltmeter in connection with Fig. 1, such a meter is not necessary to the operation of the invention. In my preferred embodiment the leads are attached directly to the amplifying system to provide the degree of amplification necessary to operate the reversing motor. Similarly, the relays and external power source may be eliminated since the motor may be operated directly from the amplified electrical potential difference between the two workpieces and effect lateral movement of the electrode responsively to such potential differences.

Similarly, I have shown the reversing motor as effecting lateral movement of the welding electrode via a pinion gear and gear rack but it will be apparent that such motion can be effected through a wide variety of electrical, mechanical, and hydraulic means.

Figure 4 shows diagrammatically an alternative structure of the invention designed for the purpose of locating a crack 80 in a metal plate 82. Three electrically conducting rollers are mounted on an insulating shaft 84 with the center roller 86 connected to a source of electrical power which is grounded at 88. The two side rollers 90, 92 serve as probing electrodes and are connected to suitable voltage amplifying means 94 and suitable voltage recording means 96.

In operation the rollers are passed over the metal plate 82 in a scanning fashion. If there is no crack between any of the rollers then there is no significant electrical potential difference between the side rollers 90, 92. However if the rollers encounter a crack in the metal in such a manner that the crack is between the center electrode 86 and one of the side rollers then there is a significant difference in electrical potential between the side rollers 90, 92.

An important use of the device of Figure 4 is the checking of welded parts wherein an improperly welded seam exhibits the electrical characteristics of a crack.

The expression "crack" is meant to cover cracks, scratches, and similar defects on the surface or within the body of the metal whether it is intended to weld such cracks or merely to point them out.

The expression, "side by side," can embrace a number of possible positions of the metal pieces to be welded, the most common being the welding of two pieces which lie in a horizontal plane. In this instance, the lateral movement of the electrode relative to the crack would also be in a horizontal plane. However, the expression would likewise include pieces lying one on top of the other wherein the lateral movement of the electrodes relative to the crack would be a movement in a vertical plane. Similarly the plane of the workpieces may lie at various angles to each other or one piece may overlap the other. In any of these cases, however, the welding principle is the same and the principles of my invention are applicable.

The size of the welding shop using the present equipment, the nature of the metal and the size of the metal pieces to be welded largely determine the particular mechanical structure which would be used to hold the welding rod and to cause its gradual movement longitudinally across the crack in the workpieces.

Large scale tests have been carried out with the apparatus and method of the invention and these have resulted in the production of clean, neat looking welds of a quality equal to any welding method hereto available.

I claim:

1. An apparatus for indexing a crack in an electrically grounded metal piece, said apparatus comprising an indexing electrode adapted to be moved across the surface of the metal piece and adapted to introduce an electric current into said piece; a pair of auxiliary electrodes spaced from each other and from said indexing electrode; and electrical means to detect differences in electrical potential between said auxiliary electrodes.

2. An apparatus for indexing a crack in an electrically grounded metal piece, said apparatus comprising an indexing electrode in the form of a roller and adapted to introduce an electric current into said piece; a pair of auxiliary electrodes in the form of rollers, one auxiliary roller on each side of but spaced from said indexing electrode, said indexing electrode and auxiliary electrodes adapted to move across the surface of the metal piece together in predetermined space relationship; and electrical means to detect differences in potential between said auxiliary electrodes.

3. The method of indexing a crack in an electrically grounded metal piece which comprises establishing electrical potentials in said metal piece by introducing an electric current into said metal piece via a moving indexing electrode, and measuring the differences in electrical potential between preselected locations on each side of said indexing electrode by means of auxiliary electrodes.

4. An electric welding apparatus for the arc welding of two pieces of metal lying side by side in welding position; said apparatus comprising a welding electrode adapted to be moved across the two pieces longitudinally in the same general direction as the crack between the pieces, electrical means to detect differences in electrical potential between said pieces, and mechanical means responsive to said electrical means to effect lateral movement of said electrode relative to said crack.

5. An electric welding apparatus for the arc welding of two pieces of metal lying side by side in welding position; said apparatus comprising a welding electrode adapted to be moved across the two pieces longitudinally in the same general direction as the crack between the pieces, electrical means to detect differences in electrical potential between said pieces, a reversing motor, and electrical elements responsive to said differences in electrical potential to direct movement of said motor, said motor being engaged with said electrode to give lateral movement of said electrode relative to said crack.

6. An electric welding apparatus for the arc welding of two pieces of metal lying side by side in welding position; said apparatus comprising a welding electrode adapted to be moved across the two pieces longitudinally in the same general direction as the crack between the pieces, electrical means to detect and amplify differences in electrical potential between said pieces, a reversing motor, and electrical elements responsive to said differences in electrical potential to direct movement of said motor, said motor being engaged with said electrode to give lateral movement of said electrode relative to said crack.

7. In an electric welding apparatus wherein two pieces of metal lying side by side in welding position are welded by a welding electrode and an electric arc between said electrode and said metal pieces: the improvement which comprises an electrical lead attached to one of said pieces of metal; a second electrical lead attached to the second of said pieces of metal; a volt meter electrically connected to said two leads in a manner to indicate a difference of electrical potential between said two pieces of metal; a conducting post on one side of the needle of said volt meter and adapted to conduct an electrical signal from said needle when said needle is deflected sufficiently by said signal to contact said post; a second conducting post on the side of said needle opposite said first conducting post and adapted to conduct a signal when said needle is deflected in the other direction as a result of the signal received from said workpieces through said conducting leads; electrical elements adapted to amplify the electrical signal passing through said volt meter needle to one of said side conducting posts; relay means responsive to said amplified signal; and a reversing motor, the direction of rotation of which is responsive to the direction of deflection of said volt meter needle; said reversing motor being engaged with said welding electrode in a manner such that the signal passed through said volt meter from said workpieces induces a directive movement in said welding electrode to minimize said signal.

8. The method of arc welding two pieces of metal lying side by side in welding position which comprises the step of introducing an electric current into said pieces to establish an electrical potential in each of said pieces and minimizing the electrical potential between said two pieces of metal by effecting lateral movement of a welding electrode relative to the crack between said metal pieces responsively to differences in electrical potential between said two pieces of metal, and effecting a weld along the length of the crack with said electrode.

9. The method of arc welding two pieces of metal lying side by side in welding position which comprises the step of introducing an electric current into said pieces to establish an electrical potential in each of said pieces and maintaining the electrical potential between said two pieces of metal below a predetermined maximum value by effecting lateral movement of a welding electrode relative to the crack between said metal pieces responsively to differences in electrical potential between said two pieces of metal, and effecting a weld along the length of the crack with said electrode.

References Cited in the file of this patent

UNITED STATES PATENTS

| | | |
|---|---|---|
| 2,588,386 | Hubbard et al. | Mar. 11, 1952 |
| 2,670,423 | Darner et al. | Feb. 23, 1954 |